(12) United States Patent
Sipilä

(10) Patent No.: US 6,327,268 B1
(45) Date of Patent: *Dec. 4, 2001

(54) HIGH SPEED DATA SERVICES FOR DECT/GSM INTERWORKING

(75) Inventor: Tuomo Sipilä, Helsinki (FI)

(73) Assignee: Nokia Mobile Phones Limited, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/948,402

(22) Filed: Oct. 10, 1997

(30) Foreign Application Priority Data

Oct. 11, 1996 (GB) .................................. 9621252

(51) Int. Cl.[7] ....................................... H04J 3/16
(52) U.S. Cl. ........................ 370/467; 455/465; 370/328
(58) Field of Search ........................... 455/465, 466; 370/467, 401, 338, 328; 375/222

(56) References Cited

U.S. PATENT DOCUMENTS 5,737,703 * 4/1998 Byrne ................................. 455/442

FOREIGN PATENT DOCUMENTS 0 748 136 A1  12/1996  (EP) .
2 296 161 A   6/1996   (GB) .
2 298 339 A   8/1996   (GB) .

OTHER PUBLICATIONS

Skolt, E., et al., "Intelligent Networks As A Platform For Provision Of Service In GSM And Dect", Telektronikk, vol. 91, NR. 4, pp. 82–87.

European Search Report (3 pages).

* cited by examiner

Primary Examiner—Chau Nguyen
Assistant Examiner—D. Trinh
(74) Attorney, Agent, or Firm—Perman & Green, LLP

(57) ABSTRACT

A DECT communication system having; at least one portable part; and a fixed part for connection to a GSM interworking unit of a GSM communication system and capable of wireless communication with the portable part to provide data service communications between the portable part and the GSM interworking unit; and including converting means for converting between data service signals at the portable part and signals in ISDN format, so as to provide data service communications between the DECT communications system and the GSM interworking unit at a data rate greater than 9600 bps.

12 Claims, 12 Drawing Sheets

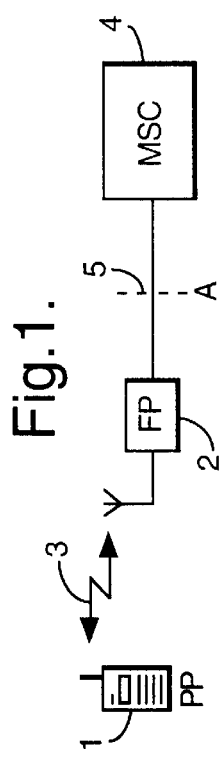

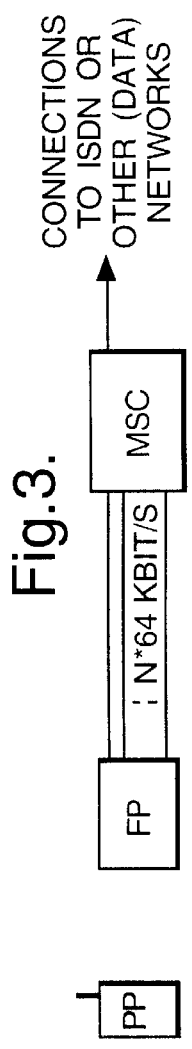
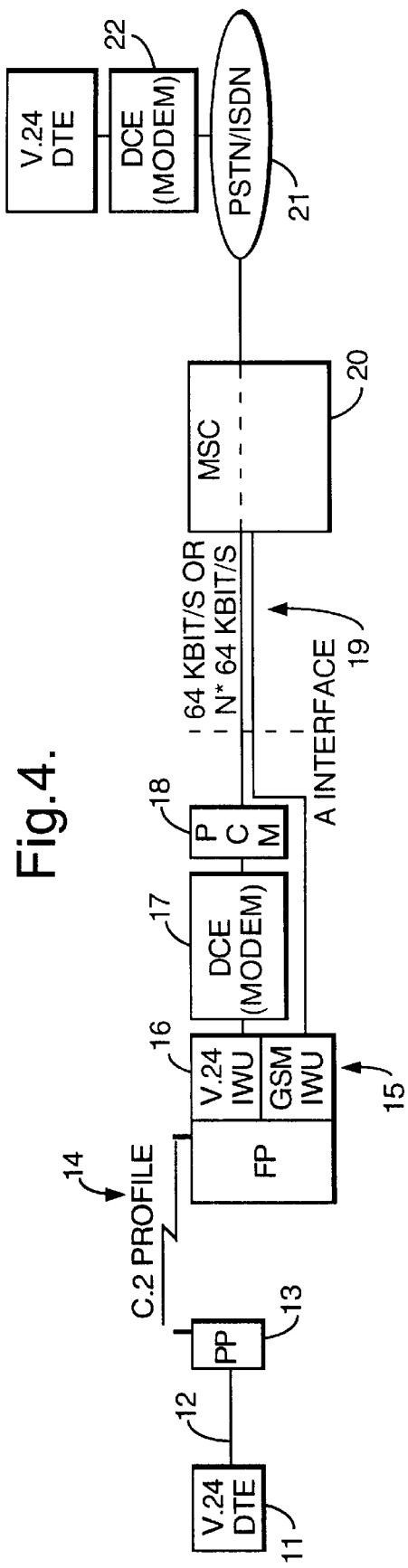
Fig.3.
Fig.4.

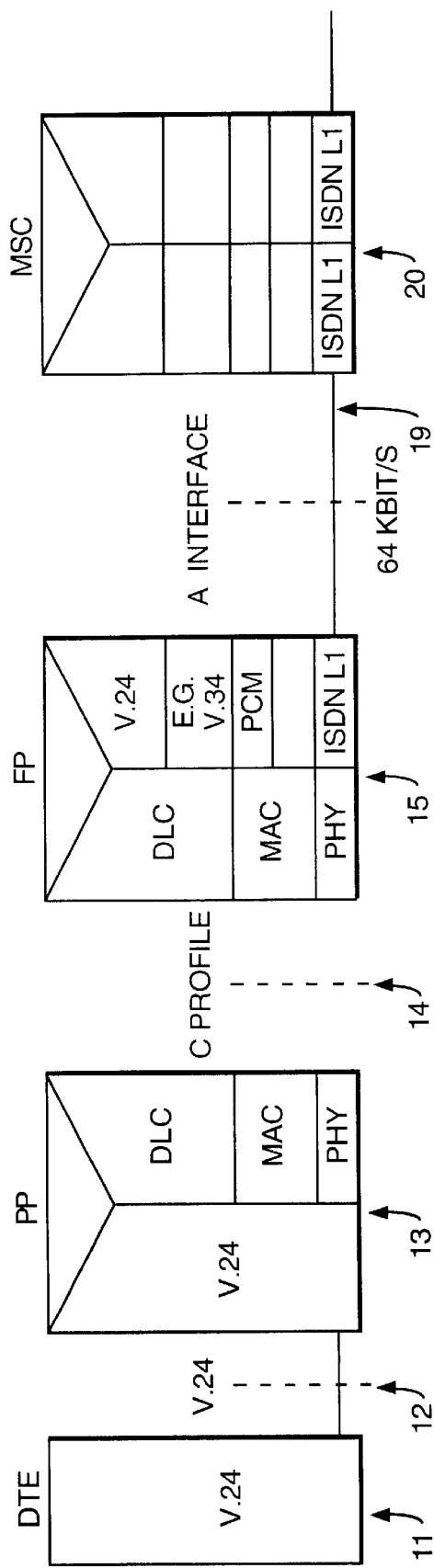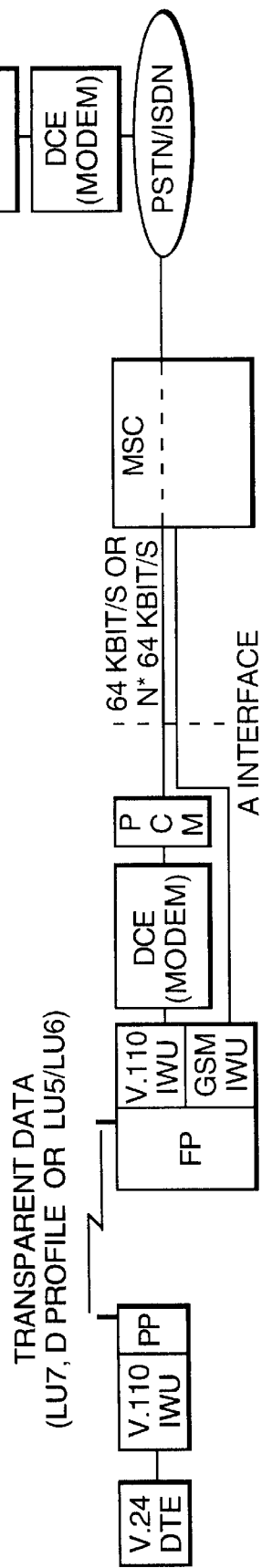
Fig.5.
Fig.6.

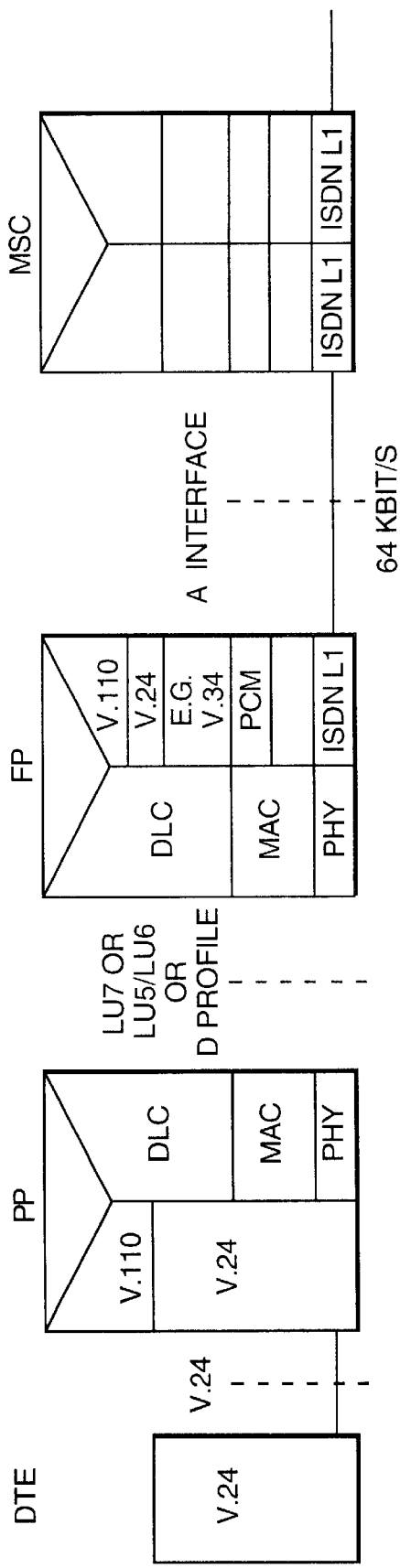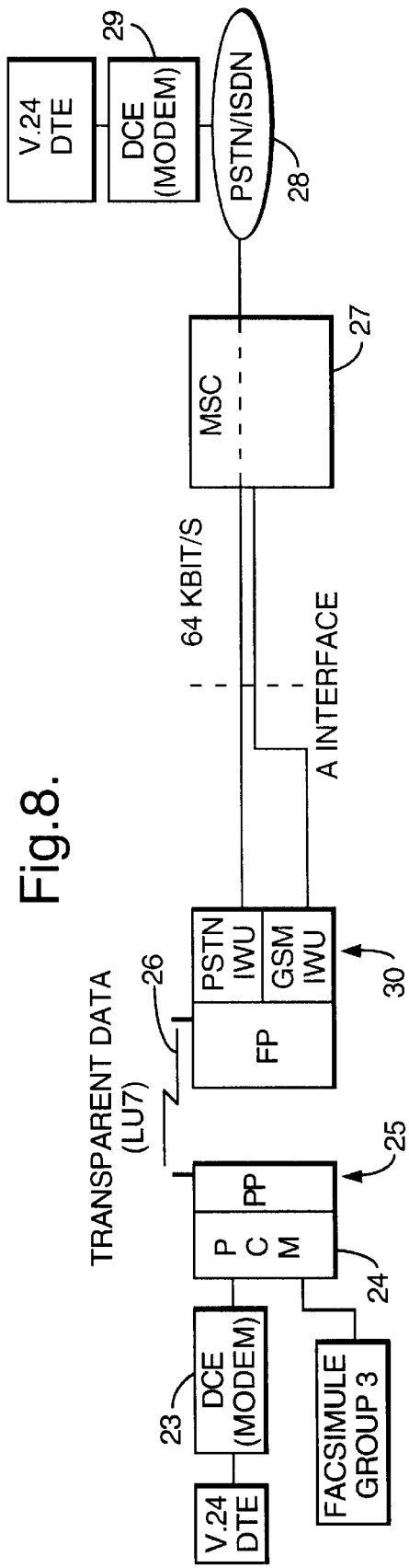
Fig.7.
Fig.8.

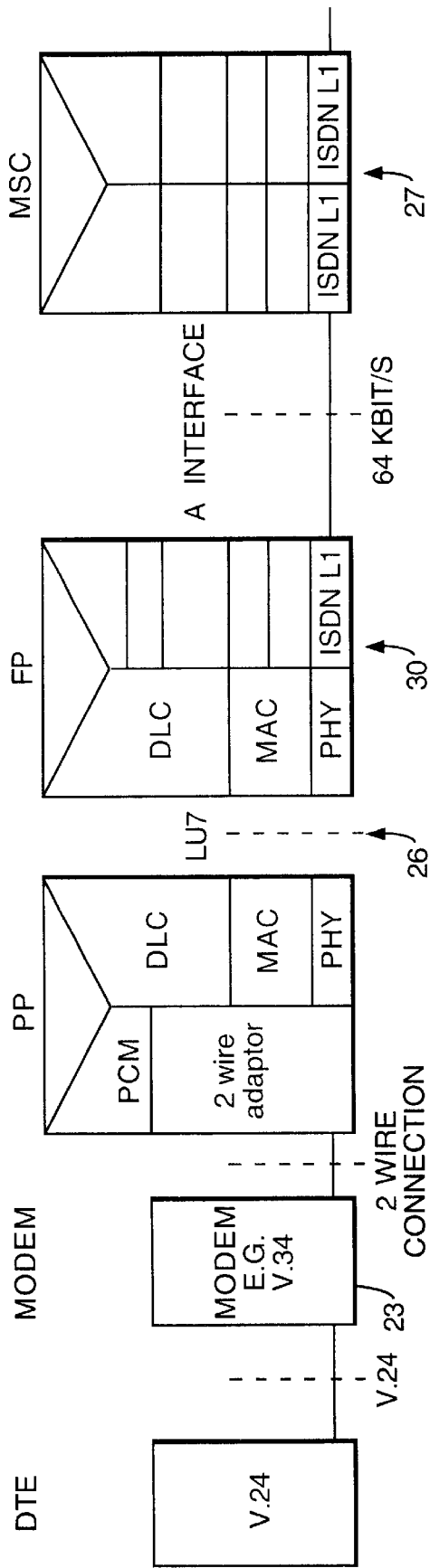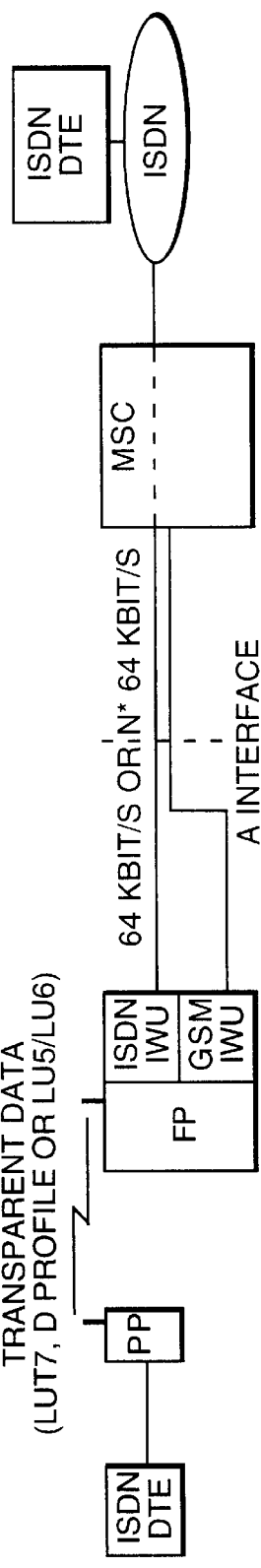

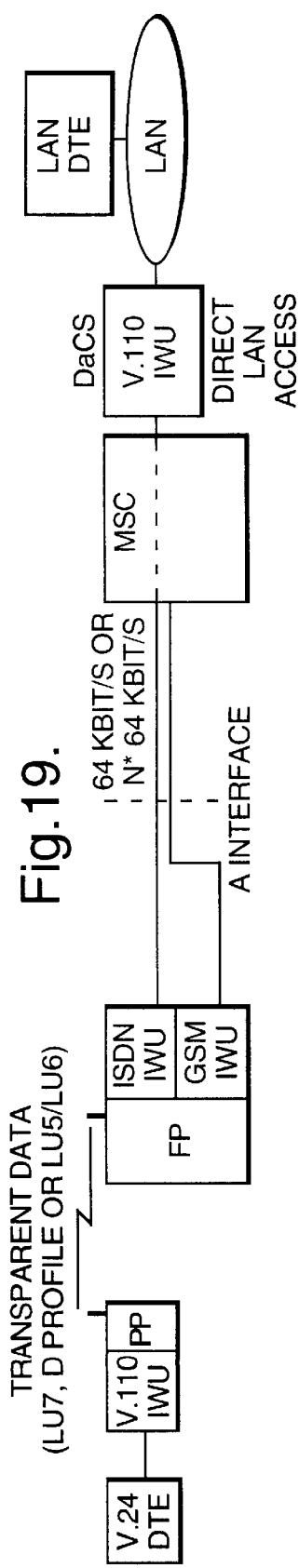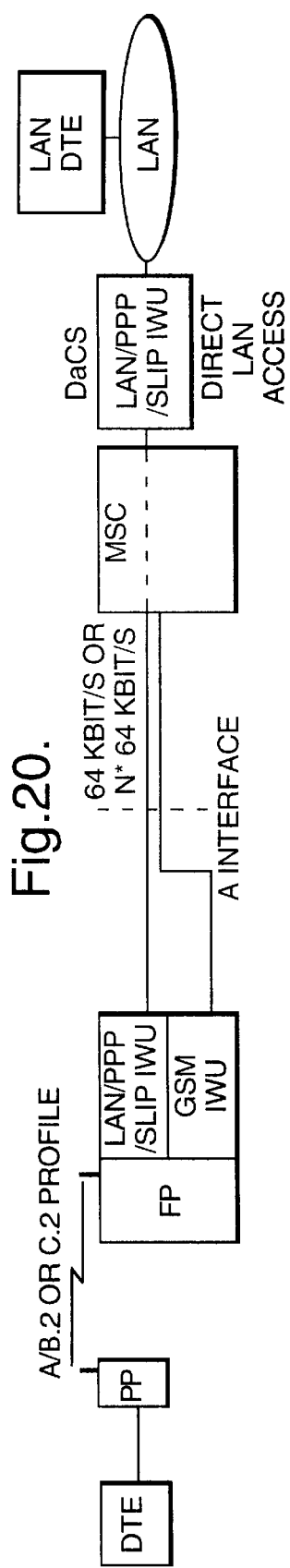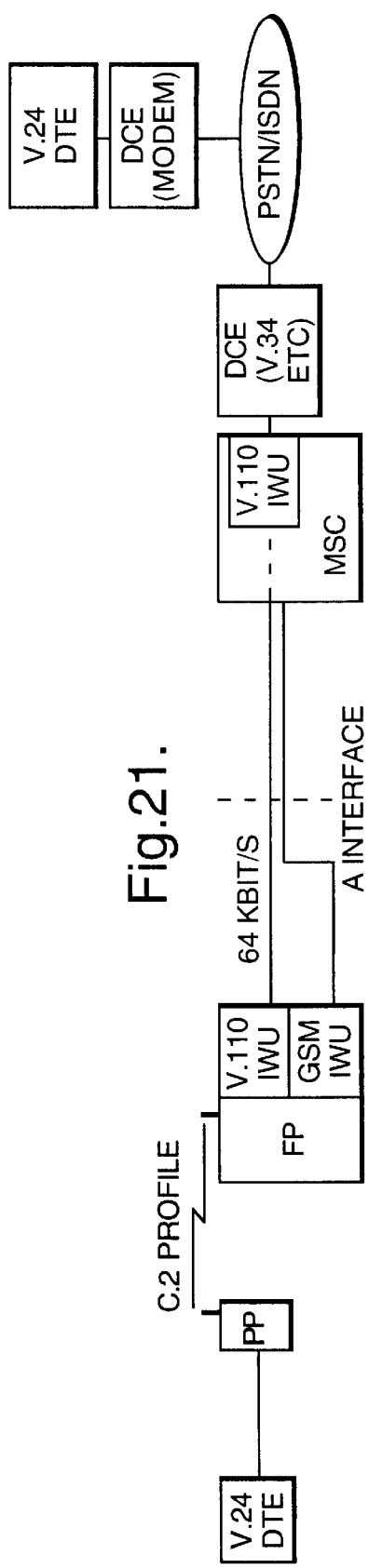

HIGH SPEED DATA SERVICES FOR DECT/GSM INTERWORKING

FIELD OF INVENTION

This invention relates to providing high speed data services across a communications system that includes a link between a DECT system and a GSM system.

BACKGROUND OF INVENTION

FIG. 1 shows the functional reference configuration for conventional interworking between a DECT (digital European cordless telephone) system and a GSM (global system for mobiles) system. FIG. 1 shows that the DECT portable part (PP)1 communicates with the DECT fixed part (FP) 2 over an air interface 3, The fixed part communicates with a GSM mobile switch centre (MSC) 4 over the standard GSM A-interface 5. In the signalling plane of the A-interface mapping takes place only on the CC/NWK and MM/NWK levels, so the DECT system does not use the lower layers of the A-interface. Documents [12] to [18] listed below provide the detailed definitions of how GSM services are provided over the DECT air interface.

Document [14] in particular defines the implementation of bearer services. This takes as its basis that in the DECT/GSM interface the GSM error correcting protocol RLP is terminated to the interworking unit (IWU) of the DECT fixed part, and the DECT air interface (based on the C data profile) provides its own error correction over the DECT air interface by the re-transmitting MAC layer protocol and by the DLC layer re-transmitting the LAPU protocol. This protocol model is illustrated in FIG. 2, where block 6 represents the DECT portable part, block 7 represents the DECT fixed part and block 8 represents the GSM mobile switch centre interworking unit. Thus, in this standard implementation the RLP and LAPU protocols function independently: the RLP protocol operating over the A-interface (9 In FIG. 2) between GSM and DECT and the LAPU protocol operating over the DECT air interface (10 In FIG. 2). Details of the DECT C data profile are given in document [21] below. This defines the provision of data rates up to and including 9600 bps (bits per second). In a conventional DECT/GSM system this data speed is the limit of the data service—in which the system carries signals representing data that has been provided to the system in a digital form by a user of the DECT portable part, or that is to be provided by the system to that user in a digital form.

This solution (where the RLP protocol is run over the A-interface between the DECT fixed part interworking unit and the GSM mobile switch centre) was chosen because of standardisation demands: the standard GSM A-interface was not to be altered and the DECT/GSM interworking system had to adapt to the solutions that had already been adopted for GSM. However, one major problem of this DECT/GSM interworking arrangement is that it is limited by the relatively low data transmission rate (9600 bps) available over the GSM air interface, although theoretically the DECT system, with higher capacity over its radio interface, could provide data rates that are much higher as well as being infrastructure-compatible. Because of this, when the DECT system is transmitting data according to the model of FIG. 2 its transmission rate must be adjusted before the interface with the GSM network so as not to exceed 9600 bps. This rate is now deemed to be relatively slow—for example current modem services are capable of operating at at least 28800 bps.

Another problem with the system is that because the RLP protocol and GSM specific V.110 rate adaptation are used over the A-interface but not over the DECT air interface the DECT fixed part interworking unit has to be complicated, and less efficient than it might otherwise be. The RLP protocol was originally designed for error correction over the GSM air interface and the modified GSM V.110 rate adaptation used under the RLP protocol was designed with the GSM air interface rates (of no more than 9600 bps) in mind. In fact, these protocols are not really needed over the A-interface in DECT/GSM interworking because the DECT protocols handle the air interface link.

Another problem is that the system of FIG. 2 cannot convey modem signals because of the limitation of the A-interface. In the GSM system this type of digital data transmission was selected for data services because the GSM voice codec is not capable of conveying modem signals. However, the air interface of the DECT system can support PCM codecs and can therefore support modem signalling. If this type of signalling could be supported over the DECT/GSM interworking link it would give the user much more flexibility.

Another issue is that GSM modem services are based on the GSM network behaving as an extended V.24 link, so that in a modem connection over GSM the data termination equipment (DTE) is connected to the mobile telephone and the data connection equipment (DCE) to the mobile switch centre. In this arrangement the mobile switch centre modem (DCE) has also to establish a connection to the far end DCE (usually located in a network external to the GSM system). This can take a long time. If in a DECT/GSM interworking system it were possible to bypass the GSM V.24 interface, and even the mobile switch centre modem, the data rates could be increased and the time to establish a connection could be decreased.

The present invention aims to address some or all of these problems.

SUMMARY OF INVENTION

According to the present invention from one aspect there is provided a DECT communication system having: at least one portable part; and a fixed part for connection to a GSM interworking unit of a GSM communication system and capable of wireless communication with the portable part to provide data service communications between the portable part and the GSM interworking unit; and including converting means for converting between data service signals at the portable part and signals in ISDN format, so as to provide data service communications between the DECT communications system and the GSM interworking unit at a data rate greater than 9600 bps.

Preferably the signals in ISDN format are carried over an ISDN communications link between the fixed part and the GSM interworking unit. That link may preferably be an A-interface between the DECT interworking unit and the GSM interworking unit. Preferably a LAP protocol such as RLP is not used over the A-interface. Most preferably the system is also capable of providing conventional 9.6 kbps data services over the A-interface. The data rate of the ISDN data is suitably at least 64000 bps, preferably a whole multiple of 64000 bps, most preferably in the range from 1 to 32 times 64000 bps. Preferably the GSM communications system includes a GSM mobile switch centre which is an ISDN exchange and which includes the GSM interworking unit.

The converting means may be provided in the DECT fixed part or the DECT portable part. Where the converting means is provided in the fixed part it is preferably provided in the interworking unit of the fixed part.

The DECT communications system suitably includes pulse code modulating means for, during communication of data from the portable part to the GSM communications system pulse code modulating data received by the portable part before its conversion to ISDN format. The fixed part may include the pulse code modulating means and/or the portable part may include the pulse code modulating means. The pulse code modulating means bay be connected to a modem, preferably a user modem.

The DECT communication system suitably comprises configuration means for transmitting link-configuration information to the GSM interworking unit. The link-configuration information may suitably include an instruction to the GSM interworking unit to disable echo cancellation over the communication link between the fixed part and the GSM interworking unit.

The signals in ISDN format are carried over the wireless link between the portable part and the fixed part, preferably with the converting means located in the portable part. If not, it is preferred that the converting means is located in the fixed part. The converting means suitably includes a local area network bridge located in the fixed part.

The DECT communication system preferably comprises means for detecting a data call originated outside the DECT communication system and activating the converting means so as to provide a data service for the call at a data rate greater than 9600 bps.

The data signals to or from the portable part may be in a second ISDN format.

Preferably the GSM communication system provides a connection to an external network. Preferably a protocol is run from that network all the way to the portable part. That protocol may be the LAP protocol. This preferably allows for convenient handover of the fixed part.

The quality of the service may be transparent or non-transparent. The service may be provided in the form of voice band data, in which case the system (suitably the mobile switch centre of the GSM system) is preferably capable of disabling echo cancellation over the 64 kbps link. A data service communication link between the portable part and the fixed part may be provided by means of the LU5/LU6, LU7, A/B, C or D profiles. The data service signals preferably contain digital user data.

According to the present invention from a second aspect there is provided a communication system comprising:

a GSM communication system having a GSM interworking unit; and a DECT communication system having:

at least one portable part; and a fixed part for connection to a GSM interworking unit of a GSM communication system and capable of wireless communication with the portable part to provide data service communications between the portable part and the GSM interworking unit;

and including converting means for converting between data service signals at the portable part and signals in ISDN format, so as to provide data service communications between the DECT communications system and the GSM interworking unit at a data rate greater than 9600 bps across at least two ISDN communication links;

the GSM interworking unit having switching means for switching the ISDN links to a common connection outside the GSM communication system.

DESCRIPTION OF THE DRAWINGS

FIG. 1 shows the functional reference configuration for DECT/GSM interworking;

FIG. 2 shows the protocol stack for standard DECT/GSM non-transparent bearer services interworking;

FIG. 3 shows a general reference model for high speed data connection between DECT and GSM;

FIG. 4 shows a reference model for non-transparent PSTN/ISDN 3.1 kHz audio access;

FIG. 5 shows a protocol stack for non-transparent PSTN/ISDN 3.1 kHz audio access;

FIG. 6 shows a reference model for transparent PSTN/ISDN 3.1 kHz audio access;

FIG. 7 shows a protocol stack for transparent PSTN/ISDN 3.1 kHz audio access:

FIG. 8 shows a reference model for voice band PSTN/ISDN 3.1 kHz audio access;

FIG. 9 shows a protocol stack for voice band PSTN/ISDN 3.1 kHz audio access;

FIG. 10 shows a reference model for transparent direct ISDN UDI access;

FIG. 19 shows a reference model for transparent direct LAN access using the C.2 profile;

FIG. 20 shows a reference model for non-transparent direct LAN access using the A/B.2 profile;

FIG. 21 shows a reference model for non-transparent V.110 rate adaptation changes in the GSM mobile switch centre interworking function;

DETAILED DESCRIPTION OF EMBODIMENTS OF THE INVENTION

Figure 11:
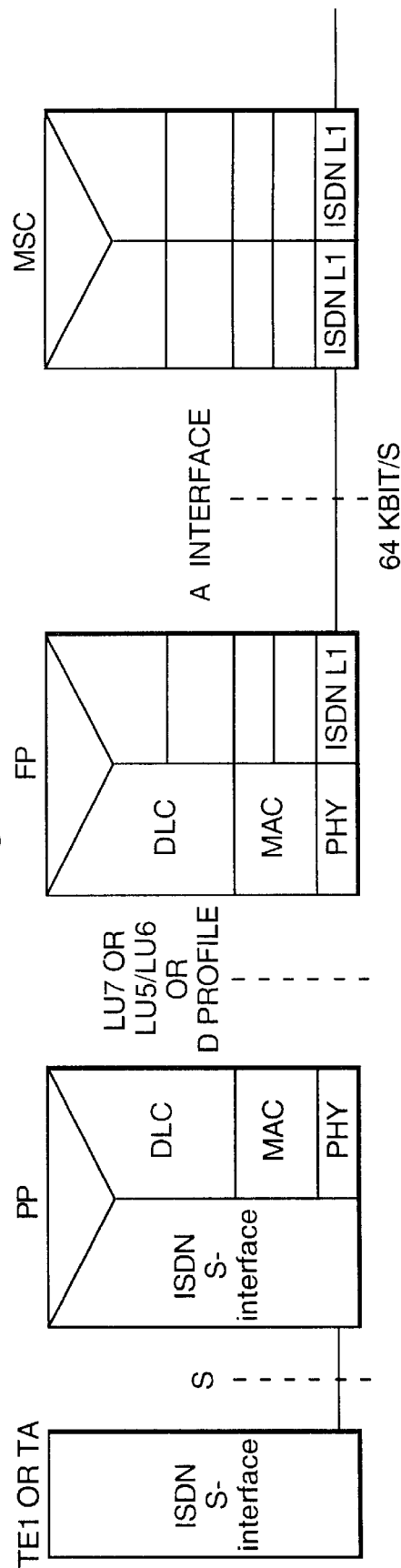
FIG. 11 shows a protocol stack for transparent direct ISDN UDI access.

The present invention will now be described by way of example with reference to the accompanying drawings.

FIG. 3 shows a general reference model for a system to provide a data connection between DECT and GSM at greater than 9600 bps. The system makes use of the fact that the GSM mobile switch centre is itself an ISDN (integrated services digital network) exchange. Therefore, its switch is capable of supporting links at the ISDN data rate of 64 kbps with the DECT fixed part. Links of this type have already been used in the DECT/GSM interworking profile when 64 kbps pulse code modulated (PCM) voice links have been used for DECT voice services. However, in the system of FIG. 3 the 64 kbps link is used for data transmissions, and up to 32 ISDN-type links at 64 kbps links can be provided for data traffic. (So the value N in FIG. 3 can be in the range from 1 to 32). In this way an added level of service can be provided to DECT handset users whose fixed part is interconnected to a GSM network.

Four basic types of interworking function are available:

1. The DECT fixed part has modem pools which use the PCM connection as a normal PSTN/ISDN 3.1 kHz modem service to provide the user of a DECT portable part with data rates up to the limits of his modem (currently typically 28.8 kbps). This is described in implementations 1 and 2 below.
2. The DECT fixed part has the interworking functions for the ISDN UDI (unrestricted digital information), thus providing ISDN data services directly to a user of a DECT portable part. This is described in implementation 3 below.
3. The GSM MSC connects the 64 kbps UDI directly or using local area network (LAN) bridges to the DECT fixed part, thus providing LAN services to a user of a DECT portable part. This is described in implementations 4, 5 and 6 below.
4. The GSM MSC interworking function is modified in order to provide V.110 rate adaptation even for higher bit-rates than 9600 bps, whilst having a high bit-rate modem for connection. This is described in implementation 7 below.

The service can be provided in the form of a GSM transparent (T) or non-transparent (NT) service. Obviously, transparent service is preferred since non-transparent service will use part of the transmission capability to provide error correction by the RLP. The RLP was originally designed to correct errors of the GSM air interface but in the present system the DECT air interface can offer its own error correction procedures, with no correction being needed on the part of the A-interface. The DECT error rate is approximately $10^{-7}$ if the MAC layer lp_error_correction service is used (A/B-data profile) or even $10^{-10}$ if a LAP protocol is used on the DLC layer (C-data profile).

Details of the A/B data profile are given in document [22]. Details of the C data profile are given in document [20].

When (in a non-transparent service) the GSM RLP protocol is used for error correction over the air interface, error correction is not needed in the A-interface since the DECT air interface is capable of providing both non-transparent and transparent services. For this reason the A-interface should function transparently, providing a flexible and simple access interface for different type of interworking services. Therefore, the DECT air interface should differentiate the non-transparent and transparent cases. This greatly simplifies the functionality of the A-interface.

The only situation where the LAP protocol (RLP) might be needed in the A-interface is during external handover (i.e. handover between two DECT fixed parts, with the MSC being the anchor between them). However, it should be noted that external handover is rare and its support is optional in the DECT/GSM interworking profiles. (In fact this question is the same as for the GSM transparent service BSC handover situation).

If transparent service is selected for the A-interface initially, there is a possibility to add later some level of LAP protocol (such as V.120) to the interface—for instance for external handover reasons. Especially when a transparent 64 kbps connection is run all the way to the DECT portable part (i.e. when the DECT air interface is also transparent) the LAP protocol (V.120) can be run from the MSC or even from the external network (ISDN) to the mobile. This solves external handover problems since the handover between DECT systems is transparent to the LAP protocol.

For implementing the air interface one of the data profiles C (see document [20]) or A/B (see document [22]) can be used for non-transparent services. For transparent services the DECT DLC (see document [4]) layer LU7, LU5/LU6 combination or D data profile (see document ([23]) are options.

Some specific implementations of this system will now be described, with reference to figures showing corresponding reference models and U-plane protocol models. The protocol model for the C-plane is described in document [12].

Implementation 1: PSTN/ISDN 3.1 kHz Audio Access

In this implementation the user's data is carried over the DECT air interface in the form of digital data information.

For non-transparent-quality service the C-data profile is used over the DECT air interface and the DECT fixed part interworks to the modem and the GSM PLMN. This is illustrated in FIGS. 4 and 5. Data terminal equipment (DTE) 11 is connected via a V.24 link 12 to the DECT portable part 13. Using the C-profile, this passes the data from DTE 11 over the DECT air interface 14 to the DECT fixed part 15. At the fixed part is a V.24 interworking unit 16 which passes the data to a modem 17. From the modem the data is pulse code modulated by PCM unit 18 and then passed over one or more ISDN links over the A-interface 19 to the MSC 20. From the MSC the pulse-code-modulated signals are passed over the PSTN/ISDN network 21 in the normal way and finally decoded by DCE equipment 22 (for instance another modem) at the end of the communication link. The reverse procedure applies when data is sent in the opposite direction.

Details of the C-data profile are given in document [20].

For transparent-quality service LU7, the D-profile or an LU5/6 combination can be used over the DECT air interface. In any of these cases the DECT air interface has to be able to support interworking to modems via a transparent link— so CCITT V.110 frames have to be run over the air interface using the said profiles. Therefore, the DECT fixed part has to be able to handle V.110 and modem interworking. This is illustrated in FIGS. 6 and 7.

Details of the D-profile are given in document [20].

Implementation 2: Voice Band Data

In this implementation the user's data is carried as PCM-coded voice band signals all the way to and from the DECT portable part. This allows a user to connect a normal voice band modem to the portable part. Hence, this implementation is especially attractive in radio local loop (RLL) environments and when facsimile equipment is to be connected to the DECT portable part.

FIGS. 8 and 9 illustrate this implementation. As these figures show, the users data is conveyed through a modem 23 and a PCM codec 24 in the portable part 25, and then as PCM-coded voice band signals over the DECT air interface 26. The MSC 27 connects the 64 kbps PCM-coded connection directly to the PSTN or ISDN 28, from where it reaches the destination modem 29 compatible with the modem 23 used at the portable part. The PCM coding is decoded in the local exchange before reaching the modem. Modems of types up to at least V.34 (28.8 kbps) can be used.

The interworking unit in the DECT fixed part 30 implements a combination of ETS 300 370 (see document [12]) for signalling, with some additions, and the C.2 data profile (see document [20]) for U-plane data.

One advantage of this implementation is that the same modem pool could be used for GSM interworking as is used for providing direct modem services between the DECT fixed part and the PSTN service. Because the MSC can handle the call in almost the same way as a voice call the load in the MSC modem pool is not increased by the demands of DECT/GSM users.

As regards the A-interface, the MSC has to disable echo cancellation over the channel being used for PCM data. To instruct this to be done for a mobile-originated call some specific coding is needed in the GSM SETUP message. When the call is mobile-terminated the DECT fixed part interworking unit may, when it has received a call and recognised it as a modem call, indicate by means of the service negotiation process that the echo cancellers should be disconnected; alternatively the MODIFY message could be used to indicate this to the MSC.

Implementation 3: Direct ISDN UDI Access

For transparent-quality service the ISDN 64 kbps UDI connection is run over the air interface all the way to the terminal. Again, this can be done by using the DECT LU7 64 kbps services, LU5/LU6 or the D-profile (see document [23]), and again the MSC provides a 64 kbps direct connection to the ISDN network where the terminal is also an ISDN DTE. This is illustrated in FIGS. 10 and 11. In the DECT fixed part interworking unit there can be a combination of ETS 300 370 (document [12]) and the DECT/ISDN interworking specification, document [24].

Figure 12:
FIG. 12 shows a reference model for non-transparent direct ISDN UDI access.
Figure 13:
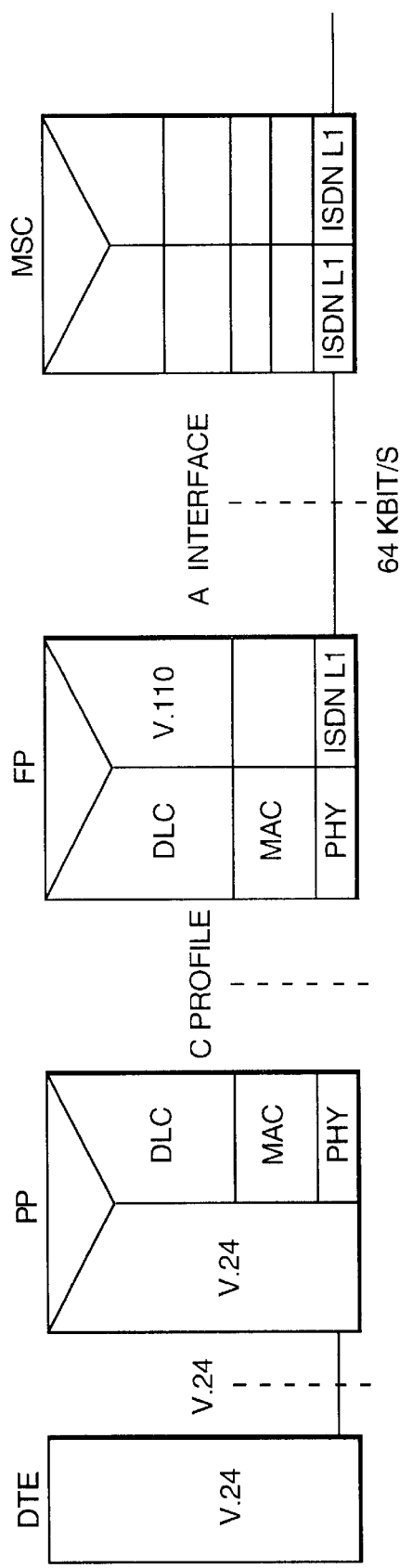
FIG. 13 shows a protocol stack for non-transparent direct ISDN UDI access.

For non-transparent-quality service the functionality of the DECT fixed part interworking unit is as described below in implementation 7. Either the terminal in the ISDN network or the ISDN network itself has to be able to interwork with V.110 frames. Another option is to use V.120. This is illustrated in FIGS. 12 and 13.

In the DECT fixed part interworking unit there can be a combination of ETS 300 370 (document [12]) and the DECT/ISDN interworking specification (document [24]).

As regard the A-interface, the MSC has to be able to signal to the ISDN network the type of ISDN service requested (e.g. UDI with or without V.110) as well as the 64 kbps transmission link and the increased user rates.

Implementation 4: LAN Access via an MSC Using a LAN Bridge

Figure 14:
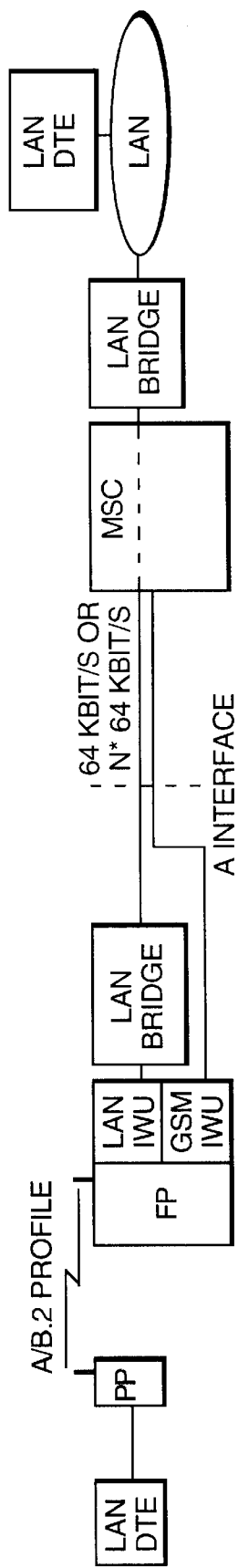
FIG. 14 shows a reference model for non-transparent bridge LAN access.
Figure 15:
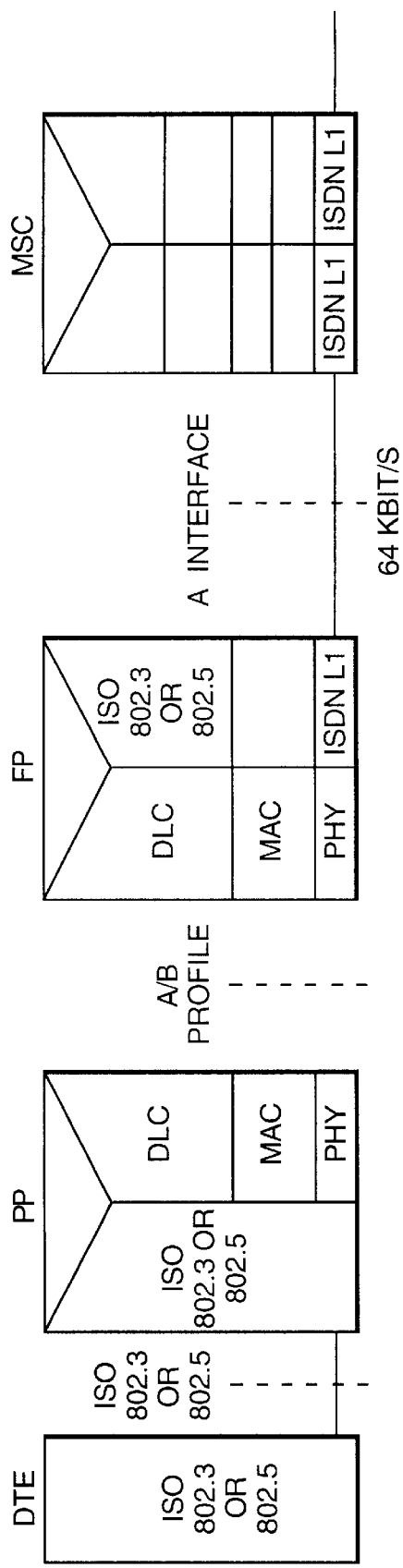
FIG. 15 shows a protocol stack for non-transparent bridge LAN access.

For non-transparent-quality service ethernet or token ring frames are run through the GSM MSC by using an ISDN 64 kbps connection. This requires a LAN bridge in the DECT fixed part and in the MSC site or in the ISDN network. A combination of A/B.2 profile LAN interworking descriptions and ETS 300 370 can be used. This arrangement is illustrated in FIGS. 14 and 15.

Figure 16:
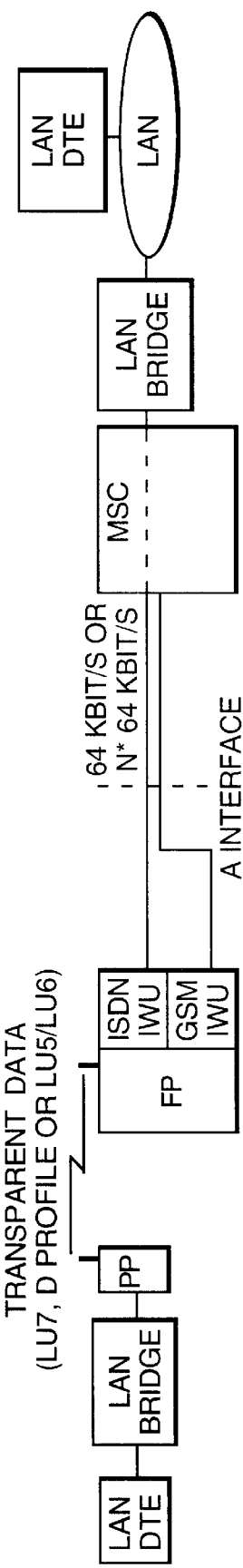
FIG. 16 shows a reference model for transparent bridge LAN access.
Figure 17:
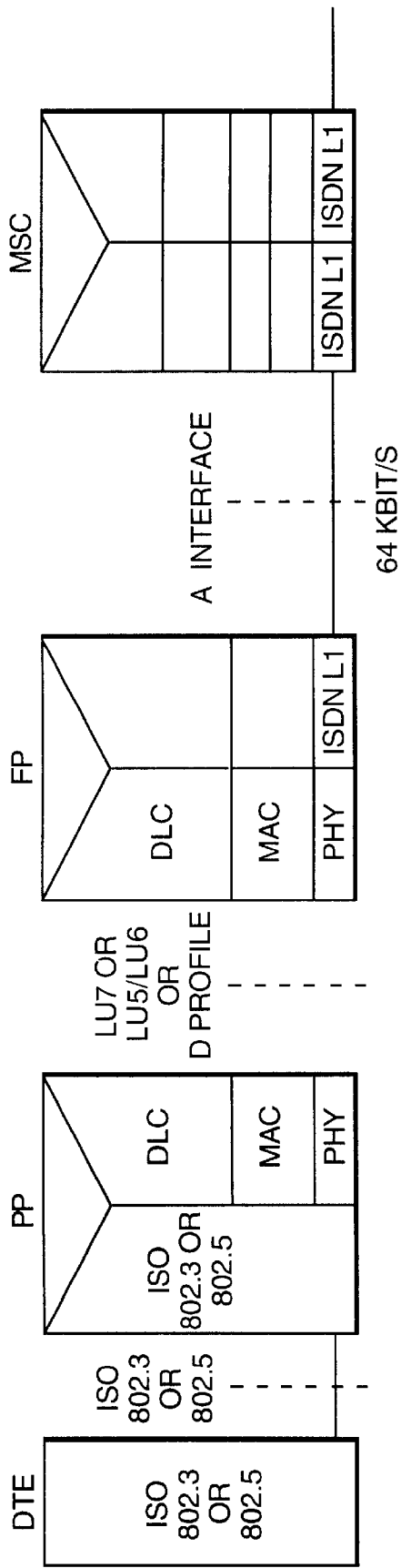
FIG. 17 shows a protocol stack for transparent bridge LAN access.

For transparent-quality service LU7, LU5/LU6 or the D-profile is used to carry the traffic of the LAN bridges over the DECT air interface. This requires ISDN LAN bridge functionality in the interworking unit of the DECT portable part. This arrangement is illustrated in FIGS. 16 and 17.

There may either be a single user for each bridge connection or a group of users using the same connection. The latter option would be practical for users of a single local area network (e.g. workers at a single company).

As regards the A-interface, there is a need for support of higher bit-rates (preferably up to 64 kbps) and UDI. The MSC does not necessarily have to know that the LAN frames are run over the link.

Implementation 5: Direct LAN Access (of the Nokia-specific Type) for V.24 DTE

Figure 18:
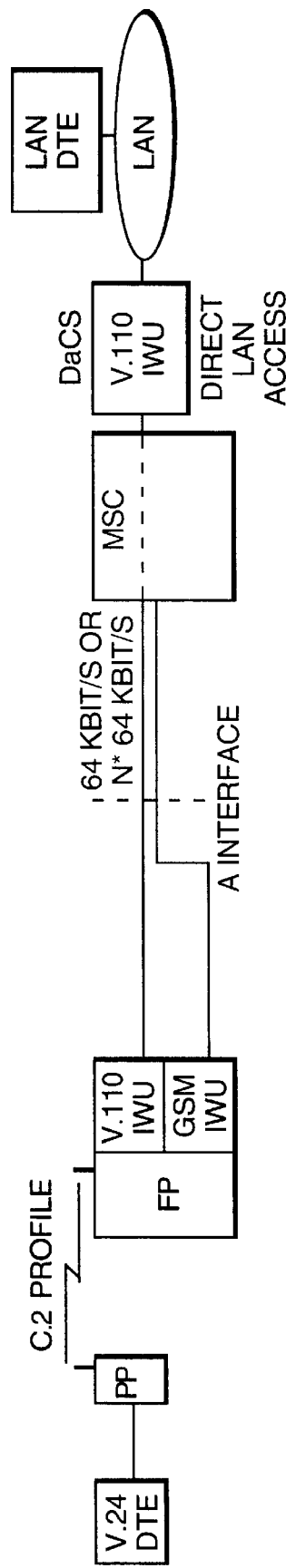
FIG. 18 shows a reference model for non-transparent direct LAN access using the C.2 profile.

This implementation illustrates how direct LAN access of the Nokia-specific type can be used in DECT/GSM interworking. In this case much higher bit-rates can be provided. The DaCS will remain more or less the same, but with the addition of V.110 rate adaptation schemes to provide data rates up to 64 kbps. The reference models for non-transparent and transparent service are illustrated in FIGS. 18 and 19 respectively.

Implementation 6: Direct LAN Access (of the Nokia-specific Type) for LAN DTE

In this implementation a further elaboration of implementation 5 provides an approach where LAN frames are run over the combined DECT/GSM system. In this configuration the DTE to portable part and the MSC to DaCS interfaces are no longer V.24 based and the DTE is capable to utilise directly either ethernet, token ring, PPP or SLIP protocols. Thus the DECT air interface carries the ISO 802.3 (ethernet), 802.5 (token ring), PPP or SLIP protocol frames over the DECT air interface more or less transparently. Some level of interworking has to be defined in the fixed part interworking unit,. i.e. a definition of how the PPP or SLIP frames are carried inside DECT frames. Non-transparent working is illustrated in FIG. 20. Because of the nature of the service no model is given for transparent working.

Implementation 7: Modified GSM MSC IWF for Modem Access

Figure 22:
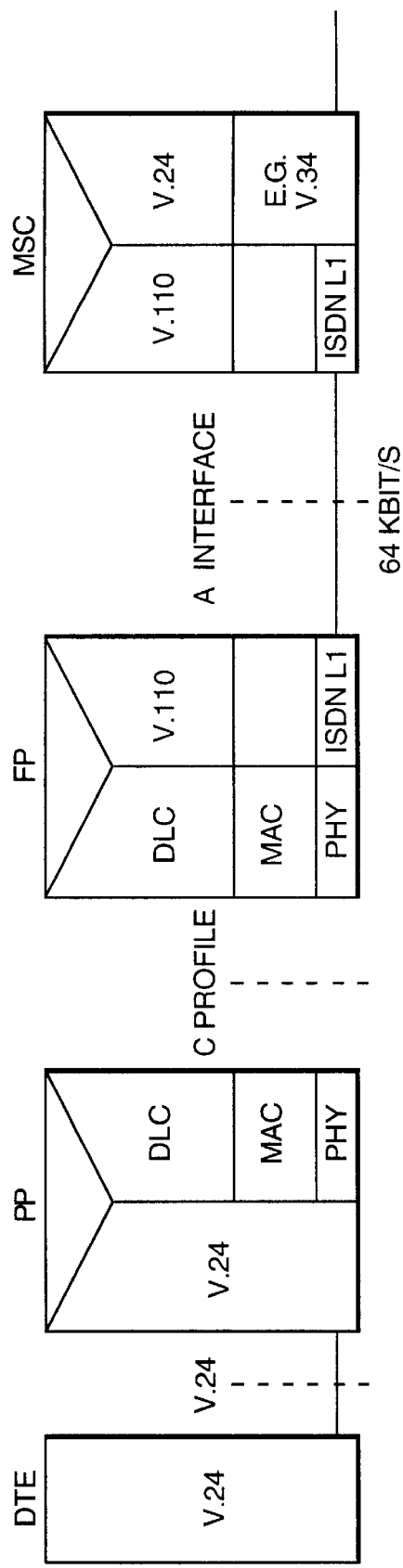
FIG. 22 shows a protocol stack for non-transparent V.110 rate adaptation changes in the GSM mobile switch centre interworking function.

For non-transparent-quality service one option is to provide high speed PSTN modems (for instance V.34, 28.8 kbps) in the MSC interworking function modem pool site and to use these when the DECT/GSM 64 kbps bearer services are used. This requires the standard V.110 rate adaptation scheme to be used in the A-interface. This scheme is already used by standard GSM transparent services, but without the coding for high speed user rates. Thus, to implement this option some changes in the signalling would be needed. The scheme is illustrated in FIGS. 21 and 22.

Figure 23:
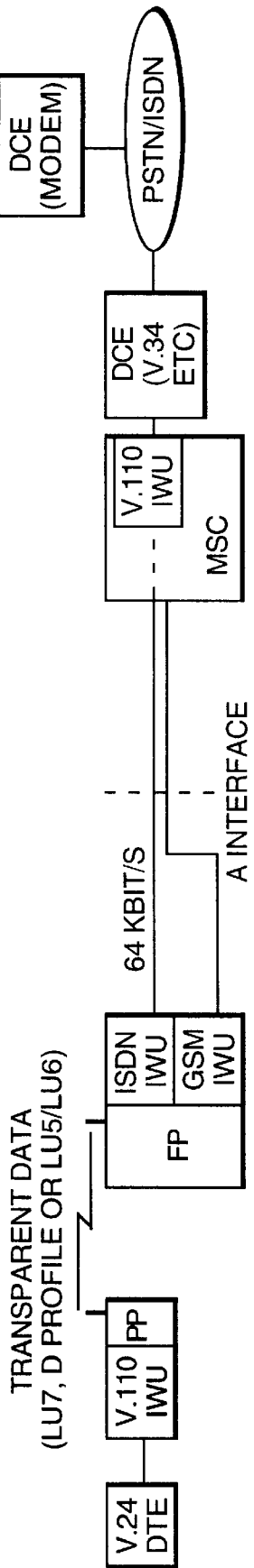
FIG. 23 shows a reference model for transparent V.110 rate adaptation changes in the GSM mobile switch centre interworking function.
Figure 24:
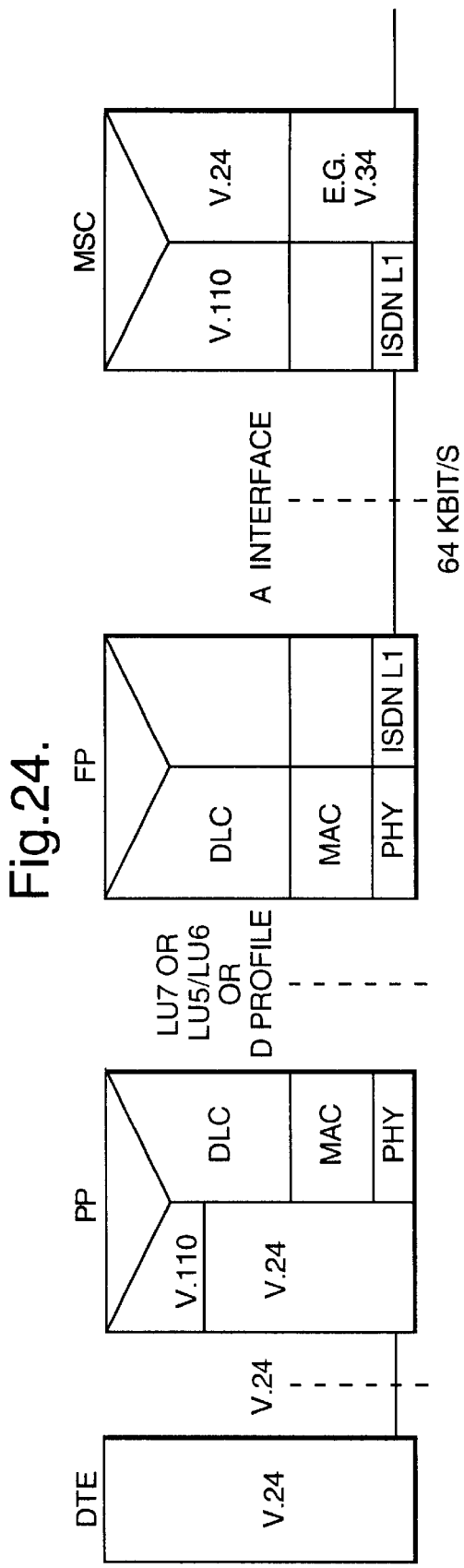
FIG. 24 shows a protocol stack for transparent V.110 rate adaptation changes in the GSM mobile switch centre interworking function.

For transparent-quality service the V.110 frames can be conveyed over the air interface by using one of the DECT air interface transparent services (LU7, LU5/LU6 or the D-profile). In this case the interworking unit of the DECT portable part has to be able to interwork with the V.110 protocol. This arrangement is illustrated in FIGS. 23 and 24.

As regards the A-interface, its signalling must be changed in this implementation in order to be able to define all the data rates added by the changed V.110 scheme. The altered (ISDN standard) V.110 must be implemented to the MSC.

The operation of these interworking implementations in the GSM and DECT systems will now be described.

Functionality in the MSC

As defined in the SETUP message, the MSC interworking function has to connect a requested connection directly to the outside network without any intervention. Therefore, the MSC has to be capable of connecting a 64 kbps link to the ISDN, the PSTN or to a LAN network.

Upon signalling of DECT/GSM 64 kbps bearer services the GSM MSC must disconnect the echo cancellers as well bypassing the rate adaptations for interworking functions if requested. In some cases the enhanced rate adaptation functions may be used:

i. if the RA 2 is to be used for better utilisation of the GSM A-interface (in this case the intermediate rates of 8, 16 or 32 kbps are used); or ii. if the modem pool of the GSM MSC interworking function offers a high rate modem (for instance a V.34 modem).

In the case of mobile-origination the SETUP message must carry the definition of the requested service. This also applies to mobile terminated calls, with the exception of an MO call originating from the PSTN where a modem is calling to a DECT terminal In that case the interworking unit of the DECT fixed part cannot recognise the modem before the U-plane has been connected. However, this problem can be overcome by having a different phone number for a high speed data connection or by using a DECT call modify functionality to change the ADPCM DECT air interface to a data-based connection.

Functionality in the DECT Fixed Part

The interworking unit of the DECT fixed part can take care of the signalling protocol messages mapping as described in document [12].

In some cases the interworking unit of the fixed part must also provide U-plane rate adaptation and multiplexing. The U-plane functionality will depend on the reference configuration.

Changes from the Standard System

Some additions to the standard GSM signalling elements are needed in order for the DECT fixed part to be informed of the high speed connection. One way of providing this information is by means of the bearer capability information element in the GSM SETUP message: for instance, one of the unused bit combinations of the USER RATE field could be used to indicate higher rates, with that field being mapped to the respective DECT field. In standard DECT coding the information element IWU-ATTRIBUTES of the DECT CC-SETUP message already has the capability to inform of rates of 2*64 kbps, 384 kbps or n*64 kbps. Therefore, no additional information elements are required on the DECT side. Alternatively, the DECT IWU-ATTRIBUTES element could be reformatted completely to fit to the needs of the DECT/GSM 64 kbps bearer service.

By studying the protocol models in the figures it will be seen that all these services, with the exception of the V.110 rate adaptation changes model, can be based on the same A-interface structure. It is the functionality of the interworking unit of the DECT fixed part that differs.

The V.110 rate adaptation changes model changes the GSM rate adaptation to be in line with the standard ISDN V.110 rate adaptation scheme, thus allowing higher rates than 9.6 kbps to be used across the A-interface. In this case, the following changes are required in the GSM A-interface:

i. Bypassing of the V.110 rate adaptation functions in the interworking unit and direct connection to the PSTN/ISDN.

ii. Implementing the altered (ISDN standard) V.110 in the mobile switch centre. (This is needed for implementation 7).

iii. New values are needed to indicate the new rate values up to 64 kbps and N times 64 kbps, either in the <user rate> field or by allocating a new octet in for the <transmission rate> field in the bearer capability element. Another option is to use the <User information layer 1 protocol> field to indicate "64 kbps DECT/GSM bearer service".

iv. In the <information transfer capability> field of the bearer capability element a value "3.1 kHz audio" is needed to indicate voice band modem connection through the MSC for implementation 1.

v. New values "32 kbps" and "not used" are needed in the <Intermediate Rate> field in the bearer capability element.

vi. For implementation 6, in the Bearer capability element new values are needed in the <User information layer 2 protocol> to indicate "SLIP", "PPP" and "ISO 802.x" (Local Area MAC layer frames.

vii. A field value to indicate DECT/GSM 64 kbps bearer services may also be needed in the Bearer capability element in order to differentiate DECT/GSM interworking from GSM services which cannot use the direct 64 kbps connection.

viii. For implementation 1 the MSC has to be able to disable the echo cancellers.

ix. If several 64 kbps links are to be used then the MSC has be able to switch these to the ISDN network, or it has to be able to multiplex multiple 64 kbps link in its interworking function.

The implementations described above all have the capability of providing higher bit-rates than for standard DECT/GSM interworking. This is done by using the capacity of the MSC for 64 kbps switching. In addition to the ISDN based connections GSM also provides mobility management to the terminals. All this can be accomplished with only minor changes in the MSC IWF and signalling. If multiple 64 kbps links are used then the MSC as well as the DECT fixed part has to be able to handle multiplexing.

The system described above can provide a number of notable advantages over the standard DECT/GSM interworking system:

a. the standard MSC interworking functions can be bypassed, with neither the RLP protocol nor the GSM V.110 being used, and so one or more 64 kbps links can be provided through the interworking network;

b. whilst the signalling of the GSM A-interface and the DECT air interface may be modified for the new type of connection and interworking function, standard V.110 rate adaptation can also be used.

c. ISDN Unrestricted Digital information (UDI) or PCM coded link(s) can be provided all the way to the DECT fixed part through the 64 kbps links with the GSM MSC;

d. the quality of service (transparent/non-transparent connection) can be distinguished only in the DECT air interface; and e. new interworking functions dependant on the desired type of interworking service can be provided, so each different type of interworking service can have its own interworking function.

This system described above combines advantages of the DECT and GSM systems for data services: the mobility offered by GSM and the high air interface transmission capability of DECT, without requiring great changes in the MSC. Using the 64 kbps links over the A-interface merely occupies capacity of the interface which is not used fully by the current GSM system (because of the limitations of the GSM air interface, current GSM data services use only part of the capacity).

This could be an attractive solution for GSM operators, allowing them to extend their current GSM networks to the expanding area of high speed data services with minor changes in their MSCs. In addition this solution can be compatible with the DSS.1+ interface, where a DSS.1 ISDN interface is provided between the DECT fixed part PBX and the MSC with added GSM based mobility.

The following table compares the current system (as defined in document [14] above) and the enhanced system described above.

| Subject | Current DECT/GSM system | Enhanced DECT/GSM system |
| --- | --- | --- |
| Data rate provided | Up to 9.6 kbps. | Up to 64 kbps and even higher in the future (assuming the MSC can switch more than one 64 kbps link to the same source/destination). |
| Interworking networks | PSTN, ISDN. | PSTN, ISDN, LAN, High speed networks. |
| Quality of service | Non Transparent. | Non Transparent, Transparent, Voice band data. |
| Signalling | Complies with GSM 04.08. | Modified GSM 04.08 (towards ISDN I.451), assuming some minor modifications to the signalling elements. |
| Data channel | GSM A-interface V.110 based rate adaptation. | ISDN UDI or ISDN V.110 or voiceband 64 kbps PCM for modems, |
| User data services | V.24 interfaced DTE connection or ISDN UDI connection. | V.24 interfaced, ISDN UDI, LAN interworking. |

Details of GSM 04.08 are given in document [26]. Details of ISDN I.451 are given in document [25].

Thus, the enhanced services provide for a much wider selection of bearer services, for example:

a. LAN interconnections. If the air interface on the DECT side is one of the base profiles (i.e. C or A/B) the GSM network can be used as a interconnecting network, for instance between two company premises which each contain a DECT PBX with voice and wireless LAN capabilities. In this case the GSM provides mobility to the local area network terminals as well as the DECT handsets.

b. Multimedia interconnections. The high data bit rate can be utilised by video phones and/or multimedia applications running in a PC connected through A DECT LAN or a PDA with a DECT data PCMCIA card.

c. High speed modem connections. Better use can be made of high speed data modems in the DECT fixed part or the MSC interworking unit.

d. Voice band modem connections. A user can connect his own modem to the DECT terminal (PP). This provides a flexible and compatible solution.

References

The following list gives details of the documents referred to above, as well as other relevant documents. Documents ETS 300 175 1 to 8 [1] to [8] and ETRs [9] to [11] give more information about the DECT system. Documents ([12] to [18] give more information about DECT/GSM interworking. Documents ([19] to [22] give more information about the DECT data profiles.

[1] ETS 300 175-1 2nd edition: "Radio Equipment and Systems (RES); Digital European Cordless Telecommunications (DECT) Common Interface Part 1: Overview".

[2] ETS 300 175-2 2nd edition: "Radio Equipment and Systems (RES); Digital European Cordless Telecommunications (DECT) Common Interface Part 2: Physical layer".

[3] ETS 300 175-3 2nd edition: "Radio Equipment and Systems (RES); Digital European Cordless Telecommunications (DECT) Common Interface Part 3: Medium access control layer".

[4] ETS 300 175-4 2nd edition: "Radio Equipment and Systems (RES); Digital European Cordless Telecommunications (DECT) Common Interface Part 4: Data link control layer".

[5] ETS 300 175-5 2nd edition: "Radio Equipment and Systems (RES); Digital European Cordless Telecommunications (DECT) Common Interface Part 5: Network layer".

[6] ETS 300 175-6 2nd edition: "Radio Equipment and Systems (RES): Digital European Cordless Telecommunications (DECT) Common Interface Part 6: Identities and addressing".

[7] ETS 300 175-7 2nd edition: "Radio Equipment and Systems (RES); Digital European Cordless Telecommunications (DECT) Common Interface Part 7: Security features".

[8] ETS 300 175-8 2nd edition: "Radio Equipment and Systems (RES); Digital European Cordless Telecommunications (DECT) Common Interface Part 8: Speech coding and transmission".

[9] ETR 015: "Digital European Cordless Telecommunications Reference document".

[10] ETR 043: "Radio Equipment and Systems (RES); Digital European Cordless Telecommunications (DECT) Common Interface Services and Facilities requirements specification".

[11] ETR 056: "Digital European Cordless Telecommunications System description document".

[12] ETS 300 370 2nd edition: Radio Equipment and Systems (RES); Digital European Cordless Telecommunications Global System for Mobile Communications (DECT/GSM) interworking profile. Access and mapping (Protocol/procedure description for 3.1 KHz speech service)

[13] prETS 300 499: "Radio Equipment and Systems (RES); Digital European Cordless Telecommunications/Global System for Mobile Communications (DECT/GSM) interworking profile GSM MSC—DECT FP Fixed interconnection".

[14] DE/RES-03071 (September 1995): "Radio Equipment and Systems; Digital European Cordless Telecommunications (DECT)./Global System for Mobile communications (DECT/GSM) inter-working profile, Implementation of bearer services".

[15] (DE/RES-03049) prETS 300 499 (August 1995): "Radio Equipment and Systems (RES); Digital European Cordless Telecommunications/Global System for Mobile Communications (DECT/GSM) Interworking profile, GSM-MSC—DECT-FP Fixed interconnection"

[16] (DE/RES-03050) (June 1995): "Radio Equipment and Systems (RES): Digital European Cordless Telecommunications/Global System for Mobile Communications (DECT/GSM) Interworking profile, GSM Phase 2 supplementary services implementation"

[17] (DE/RES-03057): "Radio Equipment and Systems (RES); Digital European Cordless Telecommunications/ Global System for Mobile Communications (DECT/ GSM) Interworking profile, Implementation of Short message services, point to point and Cell broadcast"

[18] (DE/RES-03058): "Radio Equipment and Systems (RES); Digital European Cordless Telecommunications/ Global System for Mobile Communications (DECT/ GSM) Interworking profile, Implementation of facsimile group 3"

[19] ETS 300 536 (GSM 03.40): "European digital cellular telecommunication system: Technical Realisation of the Short Message Service (SMS) Point-to-point (PP) phase 2".

[20] prETS 300 651: "Radio Equipment and Systems (RES); Digital European Cordless Telecommunications (DECT) Data services profile, Generic data link service, Service Type C, Class 2"

[21] prETS 300 435: "Radio Equipment and Systems (RES); Digital European Cordless Telecommunications (DECT) Data services profile, Base Standard including interworking with connectionless networks (Service Types A and B, Class 1)"

[22] prETS 300 701: "Radio Equipment and Systems (RES); Digital European Cordless Telecommunications (DECT) Data services profile, generic frame relay service with mobility, (Service Types A and B, Class 2)"

[23] (DE/RES-03082): "Radio Equipment and Systems (RES); Digital European Cordless Telecommunications (DECT) Data services profile, Isochronious data services with mobility, (Service Types D, Class 2)"

[24] ETS 300 434: "Radio Equipment and Systems (RES); DECT/ISDN for end system configuration" parts 1 and 2."

[25] CCITT Recommendation I.451: "ISDN user/network interface layer 3-specification."

[26] GSM 04.08 (ETS 300 557): "Digital cellular telecommunications system (Phase 2): Mobile radio interface layer 3 specification".

All these documents are incorporated herein by reference in their entirety

The present invention includes any novel feature or combination of features disclosed herein either explicitly or implicitly or any generalisation thereof irrespective of whether or not it relates to the claimed invention or mitigates any or all of the problems addressed. In view of the foregoing description it will be evident to a person skilled in the art that various modifications may be made within the scope of the invention.

What I claim is:

1. A DECT communication system having:
    at least one portable part; and
    a fixed part for connection to a GSM interworking unit of a GSM communication system and capable of wireless communication with the portable part to provide data service communications between the portable part and the GSM interworking unit;
    and including converting means for converting between data service signals at the portable part and signals in ISDN format, so as to provide data service communications between the DECT communications system and the GSM interworking unit at a data rate greater than 9600 bps.

2. A DECT communication system as claimed in claim 1, wherein the signals in ISDN format are carried over an ISDN communications link between the fixed part and the GSM interworking unit.

3. A DECT communication system as claimed in claim 1, wherein the data rate of the ISDN data is at least 64000 bps.

4. A DECT communication system as claimed in claim 1, wherein the GSM communications system includes a GSM mobile switch centre which is an ISDN exchange and which includes the GSM interworking unit.

5. A DECT communication system as claimed in claim 1, wherein the DECT communications system includes pulse code modulating means for, during communication of data from the portable part to the GSM communications system, pulse code modulating data received by the portable part before its conversion to ISDN format.

6. A DECT communication system as claimed in claim 5, wherein the fixed part includes the pulse code modulating means.

7. A DECT communication system as claimed in claim 5, wherein the portable part includes the pulse code modulating means.

8. A DECT communication system as claimed in claim 1, comprising configuration means for transmitting link-configuration information to the GSM interworking unit, the link-configuration information including an instruction to the GSM interworking unit to disable echo cancellation over the communication link between the fixed part and the GSM interworking unit.

9. A DECT communication system as claimed in claim 1, wherein the signals in ISDN format are carried over the wireless link between the portable part and the fixed part.

10. A DECT communication system as claimed in claim 1, wherein the converting means includes a local area network bridge located in the fixed part.

11. A DECT communication system as claimed in claim 1, comprising means for detecting a data call originated outside the DECT communication system and activating the converting means so as to provide a data service for the call at a data rate greater than 9600 bps.

12. A communication system comprising:
    a GSM communication system having a GSM interworking unit; and
    a DECT communication system having:
        at least one portable part; and
        a fixed part for connection to a GSM interworking unit of a GSM communication system and capable of wireless communication with the portable part to provide data service communications between the portable part and the GSM interworking unit;
        and including converting means for converting between data service signals at the portable part and signals in ISDN format, so as to provide data service communications between the DECT communications system and the GSM interworking unit at a data rate greater than 9600 bps across at least two ISDN communication links;
    the GSM interworking unit having switching means for switching the ISDN links to a common connection outside the GSM communication system.

* * * * *